United States Patent [19]

Kramb et al.

[11] 3,841,656

[45] Oct. 15, 1974

[54] VEHICLE CABLE CUTTING DEVICE

[75] Inventors: Kenneth D. Kramb; Walter J. Isabell, both of Kalamazoo, Mich.

[73] Assignee: K. I. C. Incorporated, Kalamozoo, Mich.

[22] Filed: Nov. 13, 1972

[21] Appl. No.: 305,838

[52] U.S. Cl. .............. 280/150 R, 42/90, 180/5 R, 293/1, 293/64
[51] Int. Cl. ... B60r 19/00, B60r 21/00, B60r 27/00
[58] Field of Search ......... 42/90; 280/150 R; 293/1, 293/6 D, 69, 70, 64, 65, 66, 67; 180/5 R

[56] References Cited
UNITED STATES PATENTS

| | | | |
|---|---|---|---|
| 1,107,832 | 8/1914 | Palis | 280/150 R |
| 1,181,223 | 5/1916 | Holm | 42/90 |
| 1,211,779 | 1/1917 | Steinmetz | 42/90 |
| 1,614,856 | 1/1927 | Overbeck, Jr. | 280/150 R |
| 3,680,882 | 8/1972 | Fleury | 280/150 R |
| 3,704,031 | 11/1972 | Confer | 180/5 R |
| 3,724,579 | 4/1973 | Albertson | 180/5 R |
| 3,770,293 | 11/1973 | Anderson | 180/5 R |

Primary Examiner—M. Henson Wood, Jr.
Assistant Examiner—Howard Beltran
Attorney, Agent, or Firm—Gordon W. Hueschen

[57] ABSTRACT

A vehicle safety device for the protection of vehicle occupants against a strand of rope, wire, or the like, lying across the path of vehicle travel, adapted to be mounted on a vehicle hood or the like, comprising a generally elongated body member having a forward generally horizontal portion and a rearward upwardly-sweeping portion, snagging means comprising an integral hook-type cutter having a generally horizontal cutting edge at the rearward upwardly-sweeping extremity thereof, and having mounting means for mounting on a vehicle hood or the like at a forward generally horizontal portion thereof, preferably comprising a second snagging means comprising a second integral hook-type cutter having a generally forwardly-sloping cutting edge at a forward portion of the body member thereof and extending upwardly therefrom. Preferably, the forward generally horizontal portion of the body member terminates in a forward taper.

4 Claims, 4 Drawing Figures

PATENTED OCT 15 1974          3,841,656

3,841,656

VEHICLE CABLE CUTTING DEVICE

BACKGROUND OF INVENTION

1. Field of Invention

Vehicle Safety Devices; such devices especially suitable for mounting on the hood or like element of a vehicle, such as a snowmobile, for the snagging, cutting, or breaking of wire, rope, or the like, thereby to protect the vehicle occupants.

2. Prior Art

The most pertinent prior art known to us is U.S. Pat. to Fleury, No. 3,680,882, issued Aug. 1, 1972, entitled "Snowmobile Protective Device" and a piece of Rolco, Inc. literature regarding a "Saf-T-Gard" snowmobile windshield and barbed wire protector, which latter product or literature has apparently been available since approximately September 1969. In the U.S. Patent mentioned, a safety device for a snowmobile is provided, comprising a crash frame surrounding the windshield with a pair of cutters, one on each side. In the said Rolco, Inc. literature, a similar crash frame is provided, having a center hook which allegedly helps to protect against unseen barbed wire fences. Neither of these devices is satisfactory in use of practice. Both involve a crash frame which is perhaps essential to protect against roll-overs, but not essential from the standpoint of protecting against rope, wire, or the like, strung across the path of a moving vehicle. Further, when the cutters or breakers are mounted on sides of the windshield frame, they are excessively far above the center of gravity and generally above the usual level of rope or wire, especially barbed wire, which might be encountered. In addition, they are in a substantially weakened position since they are mounted on a frame encircling the windshield, which in turn must be attached to the vehicle body. The same objection can be made to a centrally mounted bar, where such bar is supported at least at one end by the central portion of the windshield frame, or by a frame, even a crash frame, which is attached to the body portion of the vehicle only at its lower edge. With the increase in the use of self-powered vehicles of the snowmobile and other types for sport, hunting, and riding pleasure, it is apparent that improved safety devices of the type here concerned are required.

SUMMARY OF THE INVENTION

The present invention provides a vehicle safety device which can be readily mounted upon the vehicle hood or like element using simple mounting means, which can be produced from readily available and relatively inexpensive materials, and which is not subject to any of the disadvantages of previously available similar devices, as enumerated in the foregoing. The device can be readily and simply attached to the hood of a snowmobile or like vehicle, to engage and snap, cut, or break wire, rope, and other strand or strandlike impediments lying across the vehicle path which might otherwise endanger the lives and safety of occupants of the vehicle.

The device of the invention comprises a generally elongated body member of suitable material such as stainless steel or the like, having a forward generally horizontal section and a rearward upwardly-sweeping section, with mounting means for mounting to the hood or similar element of a snowmobile or similar vehicle at a forward section thereof and a suitable hook-type cutter-breaker at or near the upward extremity of the rearward section. The device may and preferably does comprise a further hook for snagging, cutting, or breaking wire, rope, or the like, at its lower generally horizontal portion, preferably at or toward the rear thereof. Further detailed description of the device of the invention will be set forth hereinafter.

OBJECTS

It is an object of the present invention to provide an improved and advantageous device of the character set forth. It is a further object of the invention to provide such a device having at least one and preferably two hook-type snagging elements, having means at a forward portion for attachment thereof to a vehicle hook or like element, especially a snowmobile hood or the like, and having a rearward upwardly-sweeping portion with a snagging hook at or near the upper extremity thereof. Additional objects will become apparent hereinafter and still other objects will be obvious to one skilled in the art.

DESCRIPTION OF THE PREFERRED EMBODIMENTS

Figure 1:
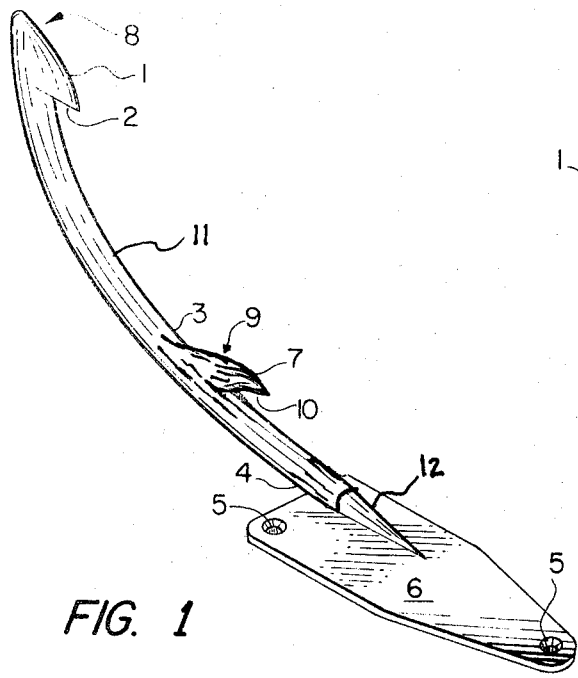
FIG. 1 is a front perspective of a vehicle safety device according to our invention.
Figure 2:
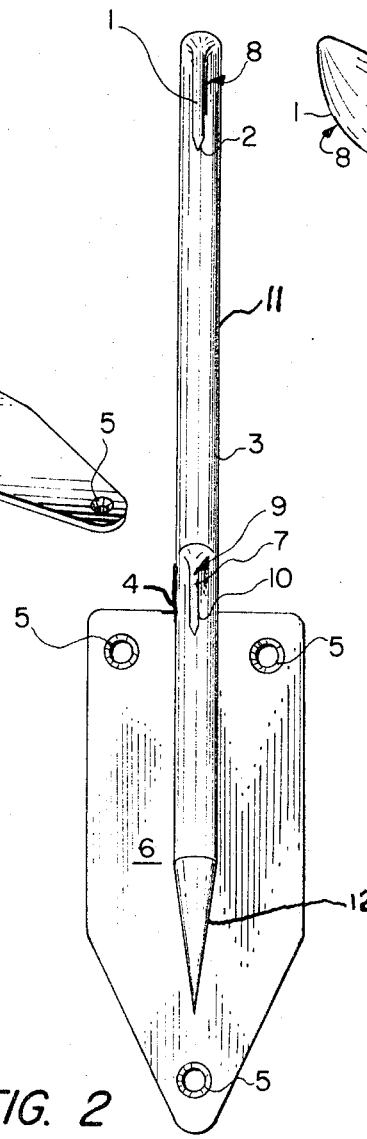
FIG. 2 is a top view of a vehicle safety device according to our invention.
Figure 3:
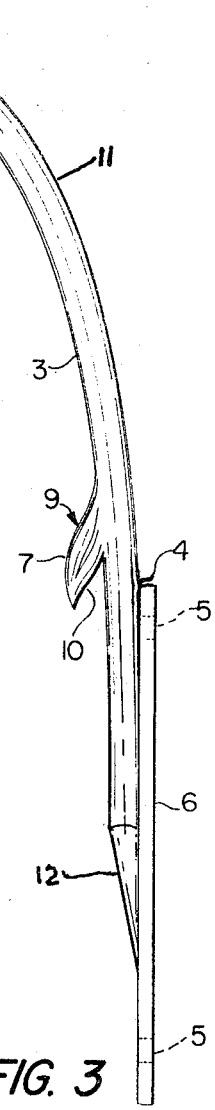
FIG. 3 is a side elevation of a vehicle safety device of our invention.

Referring to FIG. 1, the vehicle safety device comprises generally elongated body member 11, shown in the form of a bar or rod. Body member 11 comprises forward generally horizontal portion 4 and rearward upwardly-sweeping portion 3. The generally horizontal forward section 4 and rearward upwardly-sweeping section 3 are more clearly seen from the side elevation of FIG. 3. Forward generally horizontal section 4 preferably terminates in a forward taper 12, and as shown is integrally connected to mounting plate or base 6 by welding or the like. Located in mounting plate 6 are suitable apertures or openings 5 to permit mounting on a vehicle hood or the like, as shown being five-sixteenths inch in diameter, three in number, and countersunk.

Rearward upwardly-sweeping portion 3 has a snagging, cutting, or breaking element 8, hereinafter referred to as "snagging means," integral therewith at or near the upward extremity thereof, and preferably and advantageously a similar snagging means 9 is also present at a lower and more forward portion of the elongated body member. As shown, rearward upwardly-sweeping portion 3 terminates in snagging member 8 and lower generally-horizontal portion 4 comprises at the rear thereof optional but preferable snagging member 9. Snagging member 8 comprises forward edge 1 and cutting or breaking edge 2, which is as shown preferably generally horizontal, whereas snagging member 9 is upwardly extending from body portion 4 and comprises generally rearwardly-sloping edge 7 and generally forwardly-sloping cutting or breaking edge 10. Both of snagging means 8 and 9 can be referred to as comprising an integral hook-type cutter, although, depending upon the sharpness of the cutting edge and the strand encountered, the cutter may obviously also function as a strand breaker.

Figure 4:
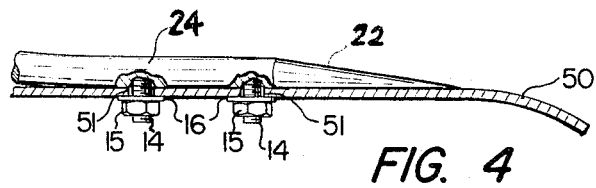
FIG. 4 is a side elevation of another embodiment of a vehicle safety device of our invention mounted on a vehicle hood, partially broken away and partially in section.

In the embodiment shown in FIG. 4, the mounting means comprises bolts 14 secured to forward generally horizontal section or base 24 forming a continuation of taper 22, as by welding, drilling, tapping, or the like. The safety device is shown mounted on a vehicle hood 50, having apertures 51 designed to receive bolts 14 therein, and is secured on the underside of the hood by washers 16 and nuts 15 and, as seen, is pulled snugly against the hood surface.

In operation, the device is simply secured on the hood of a snowmobile or like vehicle by the mounting means thereof, using nuts and bolts, or any other suitable mounting means as will be apparent to one skilled in the art. The vehicle is now ready to be placed in operation. Upon encountering an unseen or unforeseen rope, wire, cable, or like strand or strand-like obstruction in the vehicle path, the obstruction is snagged by snagging element 8 or alternatively by forward snagging element 9, which is optionally but preferably present. When snagging element 9 is present, if the obstruction is not snagged thereby, as in case a strand slips over snagging element 9, it can be effectively snagged by terminal snagging element 8. In some cases, where several strands are encountered across the vehicle path, at slightly different heights, both snagging element 9 and snagging element 8 can effect their breaking or cutting action independently upon the individual strands. The operation is simple and will be apparent to one skilled in the art.

Because it is designed to be mounted on a vehicle hood, at a position forward of the vehicle occupants, and because of its central but out-of-the-way position on the vehicle, the device of the invention can serve not only as an effective snagger for vehicle occupant safety but also as a hood ornament. Because it can be securely mounted on the vehicle hood or the like, considerably forward of the vehicle occupants, with its upwardly sweeping reach and terminal snagging element, the device is especially suitable for providing effective snagging action at a position considerably in advance of the vehicle windshield or any crash bar surrounding the same. This is of course desirable since, if a strand of wire or the like is to be snagged or cut or broken, it is preferably done as far away from the vehicle occupants as possible, again as will be obvious to one skilled in the art.

The present invention accordingly provides a vehicle safety device which can be simply and readily secured to the hood or like element of a snowmobile or like vehicle for the protection of the occupants therein by the snagging, cutting, or breaking of wire, rope, and other strand or strand-like obstructions which might accidentally and/or unforeseeably be encountered by the vehicle when in motion, and which device presents certain advantages over previously avaiable devices of a similar nature. The cutting or breaking edges 2 and 10, respectively, of snagging elements 8 and 9, may be as sharp as desired, but particularly sharp edges are not generally recommended as it is known that strand breaking is frequently more readily accomplished when the breaking edge is not especially sharp. The device may, in the particular embodiment shown, be advantageously formed with a one-half or three-fourths inch diameter rod, of round, square, or hexagonal cross-section, approximately 9 to 12 inches long, forming the body member thereof. Base plate 6 or mounting bolts 14 may advantageously be secured thereto by welding or the like. The base plate may advantageously be 1/8 × 2-½ × 4-¼inch, or of similar dimensions, and the material generally employed may for example be hot rolled steel, optionally thereafter plated, or stainless steel, e.g., of approximately the 300 series. If hot rolled steel is employed, hardening of the cutting edges 2 and 10 and the other areas of snagging elements 8 and 9 is generally recommended. Other variations: It is apparent that the elongated body member 11 can have any suitable shape, size, or cross-section and that the rearward upwardly sweeping section may be angled rather than curved. It will also be apparent that, in said embodiments, such as involve a stamped, cast, or machined body member 11, the mounting plate can be made from the same piece of material as body member 11 if desired, although with certain sacrifices of economy. Generally horizontal cutting or breaking edge 2 of snagging member 8 may slope somewhat more downwardly or upwardly than shown in the drawing, or be upwardly arched. Snagging members 8 and 9 may obviously have different profiles than shown in the side elevation.

It is to be understood that the invention is not to be limited to the exact details, or the exact materials, methods, or procedures shown and described, as obvious modifications and equivalents will be apparent to one skilled in the art and the invention is therefore to be limited only by the full scope of the appended claims.

We claim:

1. A vehicle safety device for the protection of vehicle occupants against a strand of cable, lying across the path of vehicle travel adapted to be mounted on a vehicle, comprising an integral generally elongated body member having a base and an arcuately curved upwardly-sweeping portion, snagging means comprising an integral hook-type cutter having a cutting edge at the inward part of the upwardly-sweeping extremity thereof, said base constituting mounting means for securing said safety device on a vehicle.

2. A device of claim 1 having a second snagging means comprising a second integral hook-type cutter spaced from said first snagging means.

3. A device of claim 1 wherein the arcuately curved portion terminates in a forward taper on said base.

4. A device of claim 1 wherein said base comprises a mounting plate having apertures for the insertion therein of securing means.

* * * * *